(12) United States Patent
Chen et al.

(10) Patent No.: US 9,863,753 B2
(45) Date of Patent: Jan. 9, 2018

(54) LASER HETERODYNE INTERFEROMETRIC STRAIGHTNESS MEASUREMENT APPARATUS AND METHOD WITH SIX DOFS DETERMINATION

(71) Applicant: ZHEJIANG SCI-TECH UNIVERSITY, Zhejiang (CN)

(72) Inventors: Benyong Chen, Zhejiang (CN); Liping Yan, Zhejiang (CN); Enzheng Zhang, Zhejiang (CN); Bin Xu, Zhejiang (CN)

(73) Assignee: ZHEJIANG SCI-TECH UNIVERSITY, Zhejiang (CN)

( * ) Notice: Subject to any disclaimer, the term of this patent is extended or adjusted under 35 U.S.C. 154(b) by 0 days.

(21) Appl. No.: 15/112,193

(22) PCT Filed: Feb. 6, 2015

(86) PCT No.: PCT/CN2015/072460
§ 371 (c)(1),
(2) Date: Jul. 18, 2016

(87) PCT Pub. No.: WO2016/123812
PCT Pub. Date: Aug. 11, 2016

(65) Prior Publication Data
US 2016/0370170 A1    Dec. 22, 2016

(51) Int. Cl.
*G01B 9/02* (2006.01)
*G01B 11/00* (2006.01)

(52) U.S. Cl.
CPC .......... *G01B 11/00* (2013.01); *G01B 9/02003* (2013.01); *G01B 9/02007* (2013.01); *G01B 9/0207* (2013.01); *G01B 9/02021* (2013.01); *G01B 9/02027* (2013.01); *G01B 9/02061* (2013.01); *G01B 2290/70* (2013.01)

(58) Field of Classification Search
CPC ............ G01B 9/02003; G01B 9/02007; G01B 9/02062; G01B 9/02067; G01B 9/02076
See application file for complete search history.

(56) References Cited

U.S. PATENT DOCUMENTS

| | | | | |
|---|---|---|---|---|
| 4,787,747 A * | 11/1988 | Sommargren | ....... | G01B 11/306 356/487 |
| 5,784,161 A * | 7/1998 | Bechstein | ................. | G01J 9/04 356/487 |
| 6,519,042 B1 * | 2/2003 | Wu | .................... | G01B 9/02016 356/487 |
| 2010/0141957 A1 * | 6/2010 | Hou | ....................... | G01B 11/26 356/487 |

FOREIGN PATENT DOCUMENTS

| CN | 101581576 | 11/2009 |
|---|---|---|
| CN | 101581577 | 11/2009 |

* cited by examiner

*Primary Examiner* — Jonathan Hansen
(74) *Attorney, Agent, or Firm* — JCIPRNET

(57) ABSTRACT

A laser heterodyne interferometric straightness measurement apparatus and method with six DOFs determination includes a part for determining the straightness and its position based on laser heterodyne interferometry and a part for error determination and compensation. The optical path for determination of four DOFs errors including three common beam-splitters, a polarizing beam-splitter, a planar mirror, a convex lens, a position-sensitive detector and two quadrant detectors is added in the optical configuration of the part for determining the straightness and its position based on laser heterodyne interferometry.

10 Claims, 4 Drawing Sheets

LASER HETERODYNE INTERFEROMETRIC STRAIGHTNESS MEASUREMENT APPARATUS AND METHOD WITH SIX DOFS DETERMINATION

CROSS-REFERENCE TO RELATED APPLICATION

This application is a 371 application of an international PCT application serial no. PCT/CN2015/072460, filed on Feb. 6, 2015, the disclosure of which is incorporated herein by reference in its entirety.

BACKGROUND OF THE INVENTION

Technical Field

The present invention relates to a laser heterodyne interferometric straightness measurement apparatus and method, and more particularly, to a laser heterodyne interferometric straightness measurement apparatus and method with six degrees of freedom (DOFs) determination.

Description of Related Art

Straightness, as one of the main geometric elements of stages or guide rails in the manufacturing of modern precision machinery and instruments, plays an important role in the testing of mechanical accuracy. At present, many straightness measurement methods are available and these methods can be divided into the laser measurement and the non-laser measurement by whether laser is used as the measurement carrier. The former can provide higher measurement accuracy and is easier to conduct compared with the later, and it has always been the main study subject of scholars and enterprises at home and abroad. Among the laser measurement, the laser heterodyne straightness interferometer is widely applied in the field of straightness measurement for its favorable characteristics, such as good anti-interference, high signal-to-noise ratio and high accuracy. The laser heterodyne straightness interferometer mainly comprises a dual-frequency laser, a Wollaston prism and a V-shaped retroreflector and generally determines one DOF parameter of straightness error of a measured object only. Chinese invention patents under grants No. 200910100065.2 and No. 200910100068.6 have realized the determination of two DOF parameters of straightness error and its position of a measured object by using of the optical path configuration of a nonpolarizing beam-splitter, a Wollaston prism, a V-shaped retroreflector and a polarizing beam-splitter.

In actual straightness measurement, the measuring retroreflector of a laser heterodyne straightness interferometer is mounted on the movable platform of a measured object. The platform has six DOFs error parameters during the motion, including three linear parameters (vertical straightness error, horizontal straightness error and position of straightness error) and three rotational parameters (yaw angle error, pitch angle error and roll angle error), wherein the three rotational errors will affect the measurement results of the straightness error and its position greatly and then decrease the measurement accuracy. Therefore, current laser heterodyne interferometric straightness measurement apparatuses and methods have such technical problems as incapability of eliminating the influence of these rotational errors on the straightness measurement result, and cannot realize the simultaneous determination of six DOFs error parameters of a measured object.

BRIEF SUMMARY OF THE INVENTION

The aim of the present invention is to provide a laser heterodyne interferometric straightness measurement apparatus and method with six DOFs determination. By using the principles of laser heterodyne interferometry and laser spot detection, the present invention realizes not only the simultaneous determination of multiple DOFs motion parameters of a measured object but also the compensation of the measurement error of straightness and its position, solves the technical problem of the effect of the rotational errors on the measurement result in the laser heterodyne interferometric straightness measurement, improves the measurement accuracy of straightness and its position determination, and meanwhile realizes the simultaneous measurement of six DOFs error parameters of a measured object.

The present invention adopts the following technical solution to solve the technical problem:

1. A laser heterodyne interferometric straightness measurement apparatus with six DOFs determination:

comprising a part for determining the straightness and its position based on laser heterodyne interferometry and a part for error determination and compensation, wherein the part for determining the straightness and its position based on laser heterodyne interferometry comprises a dual-frequency laser with beat frequency signal output, a nonpolarizing beam-splitter, a Wollaston prism, a reflecting prism, a first polarizing beam-splitter, a first analyzer, a second analyzer, a first photodetector and a second photodetector. The part for error determination and compensation comprises a first common beam-splitter, a second common beam-splitter, a planar mirror, a convex lens, a position-sensitive detector, a third common beam-splitter, a second polarizing beam-splitter, a first quadrant detector and a second quadrant detector. The measuring retroreflector made up of the planar mirror and the reflecting prism is mounted on the movable platform of the measured object by means of a measuring retroreflector's bracket.

The beat frequency signal output from the beat frequency signal output port of the dual-frequency laser is regarded as the reference signal. The beam emitted from the dual-frequency laser passes through the first common beam-splitter and is incident on the nonpolarizing beam-splitter. The nonpolarizing beam-splitter splits the beam into a transmitted beam of the nonpolarizing beam-splitter and a reflected beam of the nonpolarizing beam-splitter. The reflected beam of the nonpolarizing beam-splitter is incident on the first polarizing beam-splitter which splits the beam into a transmitted beam with a frequency of $f_1$ and a reflected beam with a frequency of $f_2$. The transmitted beam of the nonpolarizing beam-splitter is incident on the Wollaston prism which splits the beam into two beams with the frequencies of $f_1$ and $f_2$, respectively. After reflected by the reflecting prism, the two beams split by the Wollaston prism is superimposed with the Doppler frequency shifts caused by the motion of the measured object. The frequencies of the two beams are changed into $f_1 \pm \Delta f_1$ and $f_2 \pm \Delta f_2$. And the two beams reflected by the reflecting prism return to the Wollaston prism and combine one emerge beam.

The combined emergent beam from the Wollaston prism passes through the third common beam-splitter and is incident on the first polarizing beam-splitter, and the first polarizing beam-splitter splits this beam into a transmitted beam and a reflected beam: the transmitted beam with the frequency of $f_1 \pm \Delta f_1$ that the combined emergent beam is incident on the first polarizing beam-splitter and the reflected beam with the frequency of $f_2$ that the reflected beam of the nonpolarizing beam-splitter is incident on the first polarizing beam-splitter recombine into one beam which is incident on the first analyzer and received by the first photodetector to generate the first measurement signal;

the reflected beam with the frequency of $f_2 \pm \Delta f_2$ that the combined emergent beam is incident on the first polarizing beam-splitter and the transmitted beam with the frequency of $f_1$ that the reflected beam of the nonpolarizing beam-splitter is incident on the first polarizing beam-splitter recombine into one beam which is incident on the second analyzer and received by the second photodetector to generate the second measurement signal.

Besides the transmitted beam, one beam is reflected when the beam emitted from the dual-frequency laser is incident on the first common beam-splitter. This reflected beam is then reflected by the second common beam-splitter onto the planar mirror. The beam reflected by the planar mirror passes through the second common beam-splitter, the convex lens and then is focused to form a spot which is received by the position-sensitive detector.

Besides the transmitted beam, one beam is reflected when the combined emergent beam from the Wollaston prism is incident on the third common beam-splitter. This reflected beam is incident on the second polarizing beam-splitter which splits the beam into a transmitted beam and a reflected beam. The transmitted beam is incident on the second quadrant detector and the reflected beam is incident on the first quadrant detector.

The reflecting prism comprises an upper right-angle prism and a down right-angle prism. The two beams split by the Wollaston prism are projected to the upper right-angle prism and the down right-angle prism, respectively, and the second polarizing beam-splitter reflects the beam coming from the upper right-angle prism of the reflecting prism onto the first quadrant detector and reflects the beam coming from the down right-angle prism of the reflecting prism onto the second quadrant detector.

The measurement apparatus contains a data acquisition module and a computer, the dual-frequency laser, the first photodetector and the second photodetector are linked with the computer though the data acquisition module. The two measurement signals output from the first photodetector and the second photodetector and the reference signal from the dual-frequency laser are transmitted to the computer for processing though the data acquisition module.

The planar mirror is mounted on the reflecting prism.

The dual-frequency laser emits an orthogonally linearly polarized beam.

2. A laser heterodyne interferometric straightness measurement method with six DOFs determination applied to the apparatus:

1) the apparatus is adopted, wherein the measuring retroreflector composed of the planar mirror and the reflecting prism is mounted on the movable platform by means of the measuring retroreflector's bracket, a dual-frequency laser which can emit an orthogonally linearly polarized beam and has a beat frequency signal output port is selected, the frequencies of the emitted linearly polarized beam are $f_1$ and $f_2$, respectively, and the beam emitted from the dual-frequency laser goes through the optical path of laser heterodyne interferometry and that of error determination and compensation;

1.1) optical path of laser heterodyne interferometry:

The beat frequency signal output from the beat frequency signal output port of the dual-frequency laser is regarded as the reference signal. The beam emitted from the dual-frequency laser passes through the first common beam-splitter and is incident on the nonpolarizing beam-splitter. The nonpolarizing beam-splitter splits the beam into a transmitted beam of the nonpolarizing beam-splitter and a reflected beam of the nonpolarizing beam-splitter. The reflected beam of the nonpolarizing beam-splitter is incident on the first polarizing beam-splitter which splits the beam into a transmitted beam with a frequency of $f_1$ and a reflected beam with a frequency of $f_2$. The transmitted beam of the nonpolarizing beam-splitter is incident on the Wollaston prism which splits the beam into two beams with the frequencies of $f_1$ and $f_2$, respectively. After reflected by the reflecting prism, the two beams split by the Wollaston prism is superimposed with the Doppler frequency shifts caused by the motion of the measured object. The frequencies of the two beams are changed into $f_1 \pm \Delta f_1$ and $f_2 \pm \Delta f_2$. And the two beams reflected by the reflecting prism return to the Wollaston prism and combine one emerge beam. The combined emergent beam from the Wollaston prism passes through the third common beam-splitter and is incident on the first polarizing beam-splitter, and the first polarizing beam-splitter splits this beam into a transmitted beam and a reflected beam: the transmitted beam with the frequency of $f_1 \pm \Delta f_1$ that the combined emergent beam is incident on the first polarizing beam-splitter and the reflected beam with the frequency of $f_2$ that the reflected beam of the nonpolarizing beam-splitter is incident on the first polarizing beam-splitter recombine into one beam which is incident on the first analyzer and received by the first photodetector to generate the first measurement signal; the reflected beam with the frequency of $f_2 \pm \Delta f_2$ that the combined emergent beam is incident on the first polarizing beam-splitter and the transmitted beam with the frequency of $f_1$ that the reflected beam of the nonpolarizing beam-splitter is incident on the first polarizing beam-splitter recombine into one beam which is incident on the second analyzer and received by the second photodetector to generate the second measurement signal;

1.2) optical path of error determination and compensation:

1.2.1) Besides the transmitted beam, one beam is reflected when the beam emitted from the dual-frequency laser is incident on the first common beam-splitter. This reflected beam is then reflected by the second common beam-splitter onto the planar mirror. The beam reflected again by the planar mirror passes through the second common beam-splitter, the convex lens and then is focused to form a spot which is received by the position-sensitive detector;

1.2.2) Besides the transmitted beam, one beam is reflected when the combined emergent beam from the Wollaston prism is incident on the third common beam-splitter. This reflected beam is incident on the second polarizing beam-splitter which reflects the beam coming from the upper right-angle prism of the reflecting prism onto the first quadrant detector to form a spot and transmits the beam coming from the down right-angle prism of the reflecting prism onto the second quadrant detector to form a spot;

2) Move the movable platform to one end of the measured object which is taken as the initial position of the measurement, and measure relevant constants, including the distance H between the join point of the right-angle sides of the upper and down right-angle prisms of the reflecting prism and the movable platform, the distance B between the measuring retroreflector's bracket and the join point of the right-angle sides of the upper and down right-angle prisms of the reflecting prism and the distance $s_0$ between the measuring retroreflector's bracket and the Wollaston prism;

Prior to measurement, adjust the position-sensitive detector and the two quadrant detectors to bring the laser spot to their respective centers. During measurement, move the movable platform of the measured object from the initial position to the other end, and detection signals from the detectors are processed to obtain the DOF parameters of the measured object;

3) In accordance with the geometric relationship in the optical path of laser heterodyne interferometry, the vertical straightness error and its position of the measured object during motion are obtained using the following equations:

Vertical straightness error:

$$\Delta h = \frac{L_1 - L_2}{2\sin\theta}$$

Position of straightness error:

$$s = \frac{L_1 + L_2}{2\cos\theta}$$

where $\theta$ is a half of the divergent angle of the Wollaston prism, $L_1$ is the measurement value of the displacement of the first path, and $L_2$ is the measurement value of the displacement of the second path;

4) In the optical path of error determination and compensation, a yaw angle and pitch angle determination method as well as a roll angle and horizontal straightness determination method are employed separately to perform simultaneous measurement to achieve the four DOFs of the yaw angle, the pitch angle, the roll angle and the horizontal straightness of the measured object, and an error compensation method is employed to compensate the errors of the vertical straightness and its position measured through the optical path of laser heterodyne interferometry. Then, the six DOFs determination of the measured object is completed, and the heterodyne interferometric straightness measurement is realized.

The measurement value of the displacement of the first path $L_1$ and that of the second path $L_2$ are obtained below, respectively, 3.1) according to the reference signal output from the dual-frequency laser and the first measurement signal detected by the first photodetector, the measurement value of the displacement of the first path $L_1$ is obtained using the following equation:

$$L_1 = \frac{\lambda_1}{2}\int_0^t \Delta f_1 dt$$

where $\Delta f_1$ is the Doppler frequency shift of the beam with a frequency of $f_1$ caused by the motion of the measured object, $\lambda_1$ is the wavelength of the beam with a frequency of $f_1$, $f_1$ is the frequency of the transmitted beam output from the first polarizing beam-splitter and t is the time;

3.2) according to the reference signal output from the dual-frequency laser and the second measurement signal detected by the second photodetector, the measurement value of the displacement of the second path $L_2$ is obtained using the following equation:

$$L_2 = \frac{\lambda_2}{2}\int_0^t \Delta f_2 dt$$

where $\Delta f_2$ is the Doppler frequency shift of the beam with a frequency of $f_2$ caused by the motion of the measured object, $\lambda_2$ is the wavelength of the beam with a frequency of $f_2$, $f_2$ is the frequency of the reflected beam output from the first polarizing beam-splitter.

The yaw angle and pitch angle determination method in Step 4) specifically includes: prior to measurement, adjust the position of the position-sensitive detector to bring the spot to the center of the position-sensitive detector. During the measurement, the yaw angle error and the pitch angle error during the motion of the measured object are obtained using the following equation in accordance with the spot position deviation detected by the position-sensitive detector:

Yaw angle error:

$$\alpha = \frac{\Delta x_{PSD}}{2f}$$

Pitch angle error:

$$\beta = \frac{\Delta y_{PSD}}{2f}$$

where $\Delta x_{PSD}$ is the spot position deviation along the horizontal direction of the position-sensitive detector, $\Delta y_{PSD}$ is the spot position deviation along the vertical direction of the position-sensitive detector, and f is the focal length of the convex lens.

The roll angle and horizontal straightness determination method in Step 4) specifically includes: prior to measurement, adjust the position of the two quadrant detectors to bring the spot to their respective centers. During the measurement, the roll angle error and the horizontal straightness error during the motion of the measured object are obtained using the following equations in accordance with the mapping relationships between the spot position deviations detected by the two quadrant detectors and the DOFs of the measured object during motion:

Roll angle error:

$$\gamma = -\frac{\Delta x_{QD1} + \Delta x_{QD2}}{2(s_0 + s - B)\sin 2\theta}$$

Horizontal straightness error:

$$w = \frac{\Delta x_{QD2} - \Delta x_{QD1}}{4} - H\gamma - B\alpha - \frac{L}{2}\left(\alpha - \frac{\alpha}{n}\right)$$

where $\Delta x_{QD1}$ is the spot position deviation along the horizontal direction of the first quadrant detector, $\Delta x_{QD2}$ is the spot position deviation along the horizontal direction of the second quadrant detector, B is the distance between the measuring retroreflector's bracket and the join point of the right-angle sides of the upper and down right-angle prisms, L is the hypotenuse length of the right-angle prism, H is the distance between the join point of the right-angle sides of the upper and down right-angle prisms and the movable platform, n is the refractive index of the material of the right-angle prisms, $s_0$ is the distance between the measuring retroreflector's bracket and the Wollaston prism when the movable platform of the measured object is at the initial position before measurement, α is the yaw angle error, γ is the roll angle error, s is the position of the straightness error and θ is a half of the divergent angle of the Wollaston prism.

The error compensation method in Step 4) specifically includes: during measurement, the rotation of the measured object affects the measurement results of the vertical straightness error and its position, the vertical straightness error and its position measured through the laser heterodyne interferometry are compensated using the following equations:

Vertical straightness error after compensation:
$\Delta h' = \Delta h - (s_0 + s - B)\beta$ Position of the straightness error after compensation:

$$s' = s + \Delta h \beta - H\beta - \frac{\alpha}{2n}L$$

where B is the distance between the measuring retroreflector's bracket and the join point of the right-angle sides of the upper and down right-angle prisms, L is the hypotenuse length of the right-angle prism, H is the distance between the join point of the right-angle sides of the upper and down right-angle prisms and the movable platform, n is the refractive index of the material of the right-angle prisms, $s_0$ is the distance between the measuring retroreflector's bracket and the Wollaston prism when the movable platform of the measured object is at the initial position before measurement, α is the yaw angle error, β is the pitch angle error, Δh is the vertical straightness error, and s is the position of the straightness error.

Among above computing, the vertical straightness error and its position of a measured object are obtained by means of the data sampling and computer processing of the two measurement signals output from the two photodetectors and the reference signal output from the dual-frequency laser, the yaw angle error, the pitch angle error, the roll angle error and the horizontal straightness error of the measured object are obtained by means of the data sampling and computer processing of the laser-spot position signals output from the position-sensitive detector and the two quadrant detectors, and the accurate values of the vertical straightness error and its position eliminating the influence of the rotational errors of the measured object are obtained by computer processing according to the error compensation method.

The beneficial effects of the present invention include:

(1) The measurement method can realize the simultaneous determination of six DOFs error parameters of a measured object, providing great convenience for the performance testing and calibration of precision stages or guide rails;

(2) The measurement method eliminates the influence of the rotational errors of a measured object during the measurement of straightness and its position based on laser heterodyne interferometry through the error compensation method, improving the measurement accuracy effectively and the measurement method of straightness and its position based on laser heterodyne interferometry;

(3) The optical configuration is simple and easy to use.

The present invention mainly applies to the simultaneous determination of straightness, displacement and other multi-DOF motion parameters of precision stages and precision guide rails in the technical field of ultraprecision mechanical machining, micro-opto-electro-mechanical systems, manufacturing of integrated circuit chips and precision instruments.

DETAILED DESCRIPTION OF THE INVENTION

The present invention will be described in details hereinafter with the embodiments and the drawings.

Figure 1:
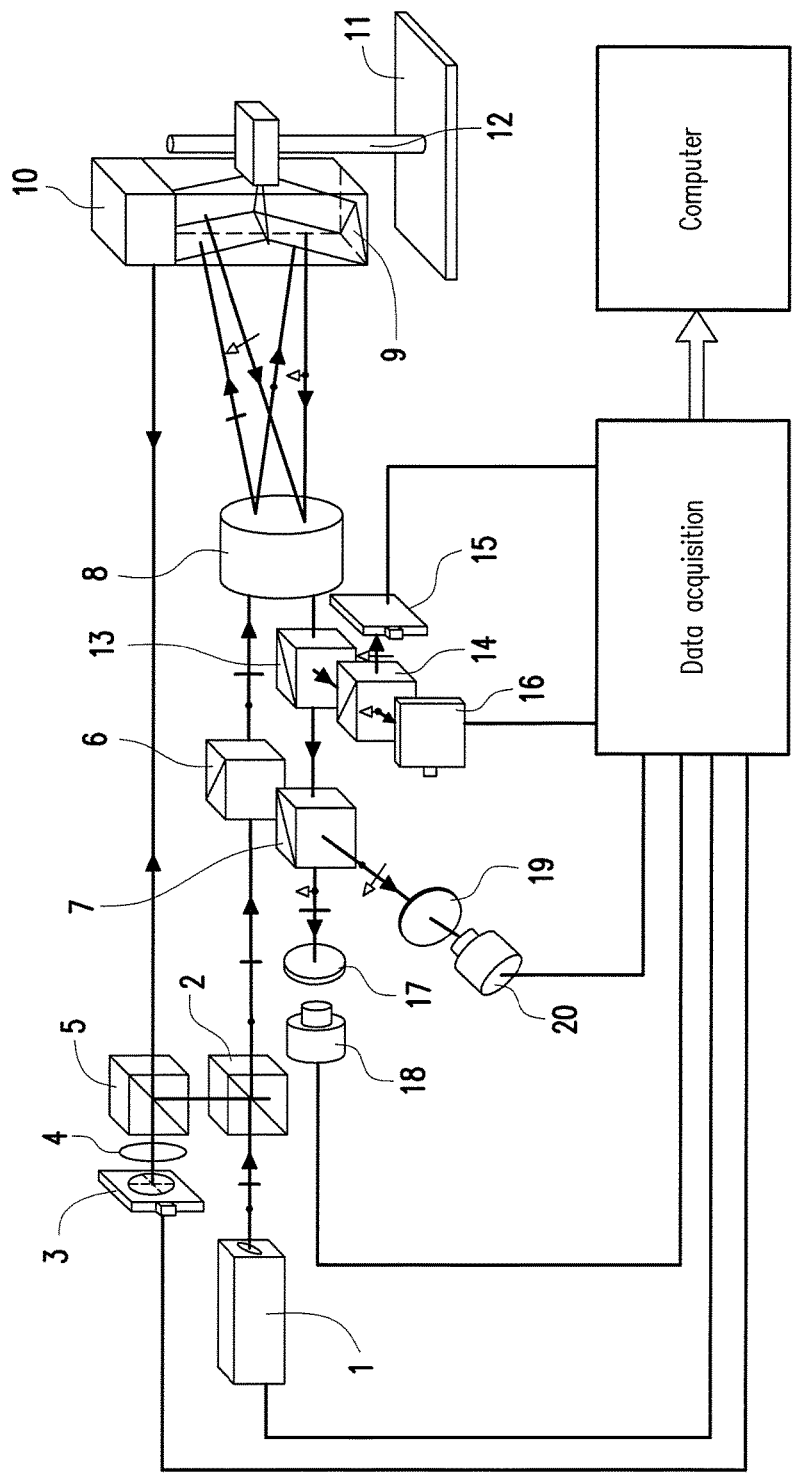
FIG. 1 illustrates the optical configuration of the laser heterodyne interferometric straightness measurement with six DOFs determination.

The optical configuration of the apparatus according to the present invention, as shown in FIG. 1, includes the part for determining the straightness and its position based on laser heterodyne interferometry and the part for error determination and compensation. The detailed embodiment is as follows:

The dual-frequency laser 1 is a He—Ne frequency stabilized laser with the transverse Zeeman effect and emits an orthogonally linearly polarized beam with the frequencies of $f_1$ and $f_2$ respectively. The polarized beam is split by the first common beam splitter 2 into two beams, the reflected beam is reflected by the second common beam-splitter 5 onto the planar mirror 10 which reflects the beam back onto the second common beam-splitter 5, and the beam passes through the second common beam-splitter 5 and is focused by the convex lens 4 onto the position-sensitive detector 3, wherein the planar mirror 10 is mounted on the top of the reflecting prism 9 comprising an upper right-angle prism and a down right-angle prism, and the planar mirror 10 and the reflecting prism 9 form a measuring retroreflector which is fixed on the movable platform 11 of a measured object by means of the measuring retroreflector's bracket 12. The beam transmitting the first common beam-splitter 2 is incident on the nonpolarizing beam-splitter 6 and split into two beams, wherein the reflected beam is incident on the first polarizing beam-splitter 7 while the transmitted beam is incident on the Wollaston prism 8. Due to the birefringence of the Wollaston prism 8, the transmitted beam is split into two linearly polarized beams with the frequencies of $f_1$ and $f_2$ respectively and an certain angle, the two beams are incident on the upper right-angle prism and the down right-angle prism of the reflecting prism 9 respectively and reflected by them onto another point of the Wollaston prism 8, wherein the frequencies of the two beams are changed into $f_1 \pm \Delta f_1$ and $f_2 \pm \Delta f_2$ due to superposition with the Doppler frequency shifts caused by the motion of the measured object, the two beams form an orthogonally linearly polarized beam when coming out from the other side of the Wollaston prism 8, the orthogonally linearly polarized beam is split into two beams after passing the third common beam-splitter 13. The reflected beam is incident on the second polarizing beam-splitter 14 and split into two linearly polarized beams, which have the frequency of $f_1 \pm \Delta f_1$ and $f_2 \pm \Delta f_2$, respectively, wherein the former coming from the upper right-angle prism of the reflecting prism 9 is incident on the first quadrant detector 15, meanwhile the later coming from the down right-angle of the reflecting prism 9 is incident on the second quadrant detector 16. And the beam transmitting the third common beam-splitter 13 is incident on the first polarizing beam-splitter 7 and split into two linearly polarized beams with different frequencies again. The beam with the frequency of $f_1 \pm \Delta f_1$ transmitting the first polarizing beam-splitter 7 combines with the beam with the frequency of $f_2$ reflected by the nonpolarizing beam-splitter 6 and the first polarizing beam-splitter 7, and they are incident on the first analyzer 17, transmit the first analyzer 17 and produce a beat frequency signal which is received by the first photodetector 18 to generate the first measurement signal. Meanwhile the beam with the frequency of $f_2 \pm \Delta f_2$ reflected by the first polarizing beam-splitter 7 combines with the beam with the frequency of $f_1$ reflected by the nonpolarizing beam-splitter 6 and transmitting the first polarizing beam-splitter 7, and they are incident on the second analyzer 19, transmit the second analyzer 19 and produce another beat frequency signal which is received by the second photodetector 20 to generate the second measurement signal.

In accordance with the present invention, the first common beam-splitter 2 is arranged between the dual-frequency laser 1 and the nonpolarizing beam-splitter 6; the third common beam-splitter 13 is arranged between the Wollaston prism 8 and the first polarizing beam-splitter 7.

In addition, the beat frequency signal with a frequency of $f_1-f_2$ self-contained at the rear of the dual-frequency laser 1 acts as the reference signal shared by the two measurement signals. The three signals are the signal sources of the part for determining the straightness and its position based on laser heterodyne interferometry. The laser-spot position information of the position-sensitive detector 3 and the two quadrant detectors 15 and 16 is the signal sources of the part for error determination and compensation. These signals from the two parts are sent to a data acquisition module and a computer for appropriate processing and display to obtain the six DOFs parameters of the yaw angle error, the pitch angle error, the roll angle error, the horizontal straightness error, the error-compensated vertical straightness error and its position during the motion of the measured object.

In the embodiment, the dual-frequency 1, which is a 5517A dual-longitudinal-mode frequency-stabilized He—Ne laser made by the U.S. Agilent company, emits a orthogonally linearly polarized beam with the frequency difference of $f_1-f_2=1.7$ MHz and the centre wavelength of $\lambda=632.99137$ nm. Laser heterodyne interferometric signal processing is implemented with the high-speed signal processing board containing a FPGA chip of EP2C20Q240 made by the U.S. Altera company. The position-sensitive detector 3, which is a PDP90A position-sensitive detector made by the U.S. Thorlabs company, has a detection resolution of 0.675 μm, and the signal processing of the position-sensitive detector is implemented with the TQD001 signal processing module made by the Thorlabs company. The quadrant detectors 15 and 16, which are Spotonusb-qq made by the Israel Duma company, have a resolution of 0.75 μm and a accuracy of ±1 μm, and the signal processing of the quadrant detectors are implemented with a Manifold Box signal processing module made by the Duma company. And the computer is a Pro4500 desktop computer made by the HP company.

In FIG. 1, the dark spot and the vertical short line in the optical path represents two linearly polarized beams of different frequencies with orthogonal polarization directions, while the dark spot with a triangle above it and the vertical short line with a triangle above it represents the orthogonally linearly polarized beams containing Doppler frequency shift information.

Figure 2:
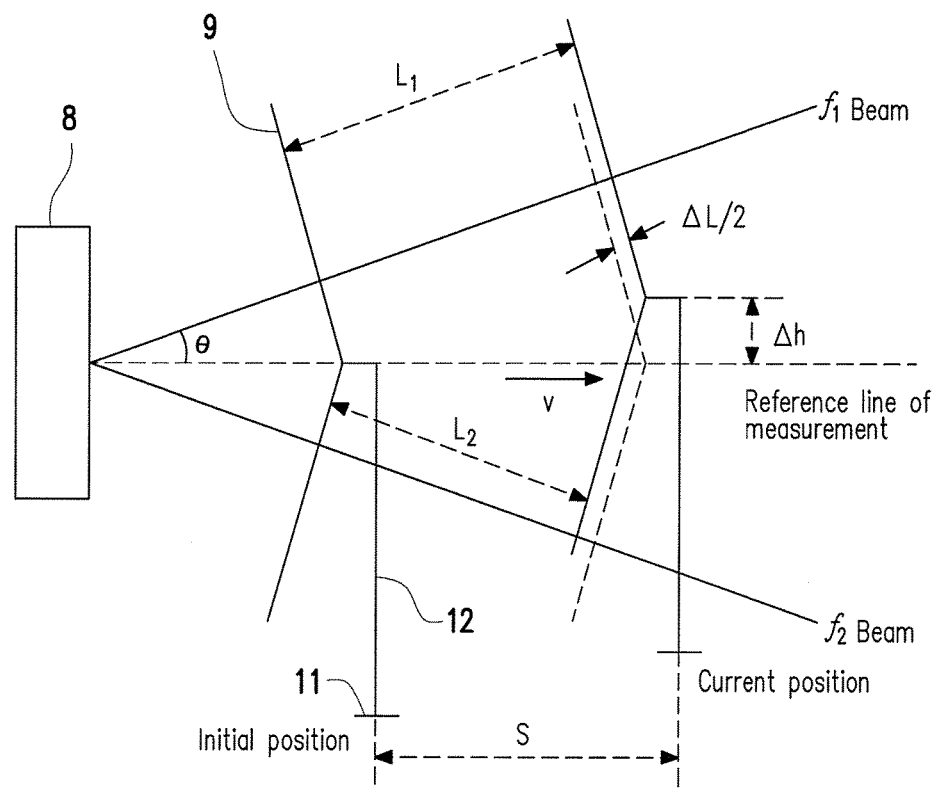
FIG. 2 illustrates the measurement principle of the laser heterodyne interferometric straightness and its position.

With reference to FIGS. 2, 3, 4 and 5, the specific embodiment and the principle of the laser heterodyne interferometric straightness measurement are as follows:

(1) Prior to measurement, fix the reflecting prism 9 mounted with a planar mirror 10 on its top onto the movable platform 11 of the measured object by means of the measuring retroreflector's bracket 12. Move the platform to one end of the measured object where is taken as the initial position of the measurement, and measure relevant constants, including the distance H between the join point of the right-angle sides of the upper and down right-angle prisms of the reflecting prism 9 and the movable platform 11, the distance B between the measuring retroreflector's bracket 12 and the join point of the right-angle sides of the upper and down right-angle prisms of the reflecting prism 9 and the distance $s_0$ between the measuring retroreflector's bracket 12 and the Wollaston prism 8. Adjust the position-sensitive detector 3 and the two quadrant detectors 15 and 16 to bring the laser spot to the center of each detector;

(2) Once the measurement is begun, move the movable platform 11 of the measured object from the initial position to the other end with a certain step displacement, and each detector detects relevant signals which are sampled and sent to the computer for processing to obtain each DOF parameter of the measured object;

(3) For the determination of the vertical straightness and its position, as shown in FIG. 2, the reflecting prism 9 moves from the initial position to the current position with a speed v of 1 mm/s and the step displacement of 5 mm, and the divergent angle of the Wollaston prism 8 is 1.5°. Then the frequency changes of the measurement beams $f_1$ and $f_2$ caused by the Doppler effect are:

$$\Delta f_1 = \mp \frac{v\cos\theta}{\frac{\lambda_1}{2}}$$

$$\Delta f_2 = \pm \frac{v\cos\theta}{\frac{\lambda_2}{2}}$$

where $\lambda_1$ and $\lambda_2$ are the laser wavelengths of the two frequencies, and $\theta$ is a half of the divergent angle of the Wollaston prism;

The frequencies of the first measurement signal and the second measurement signal are $f_1-f_2 \pm \Delta f_1$ and $f_1-f_2 \pm \Delta f_2$, respectively, and computing the differences between the two measurement signals and the reference signal (its frequency: $f_1-f_2$) obtains $\Delta f_1$ and $\Delta f_2$, respectively. Then the corresponding measurement value of the displacement of the first path and that of the second path are:

$$L_1 = \int_0^\tau v\cos\theta \, dt = \frac{\lambda_1}{2} \int_0^\tau \Delta f_1 \, dt$$

$$L_2 = \int_0^\tau v\cos\theta \, dt = \frac{\lambda_2}{2} \int_0^\tau \Delta f_2 \, dt$$

The difference between the two displacement values:

$$\Delta L = L_1 - L_2$$

In accordance with the geometric relationship shown in FIG. 2, the vertical straightness error and its position of the measured object during motion are:

Vertical straightness error:

$$\Delta h = \frac{L_1 - L_2}{2\sin\theta}$$

Position of straightness error:

$$s = \frac{L_1 + L_2}{2\cos\theta}$$

Figure 3:
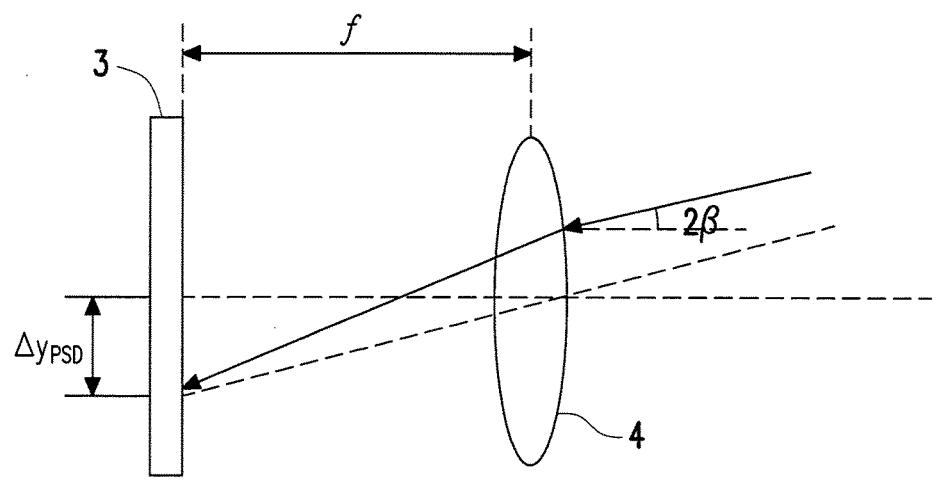
FIG. 3 illustrates the measurement principle of the yaw angle and the pitch angle (take the pitch angle as an example).

When the reflecting prism 9 moves upward relative to the reference line of measurement, i.e. moves from the dotted-line position to the solid-line position, as shown in FIG. 2, $\Delta h$ is positive, otherwise $\Delta h$ is negative;

(4) For the determination of the yaw angle and the pitch angle, as shown in FIG. 3, their measurement principle is same and the explanation will be described by taking the pitch angle as an example. The measured object has a pitch angle error $\beta$ at the current position, and then the beam will have a change of $2\beta$ of the pitch angle after reflection by the planar mirror 10. The beam is incident on the convex lens 4 and focused on the position-sensitive detector 3, and the spot position deviation along the vertical direction of the detector is $\Delta y_{PSD}$, then according to the geometric relationship, the pitch angle error of the measured object during the motion can be obtained:

Pitch angle error:

$$\beta = \frac{\Delta y_{PSD}}{2f}$$

Figure 4:
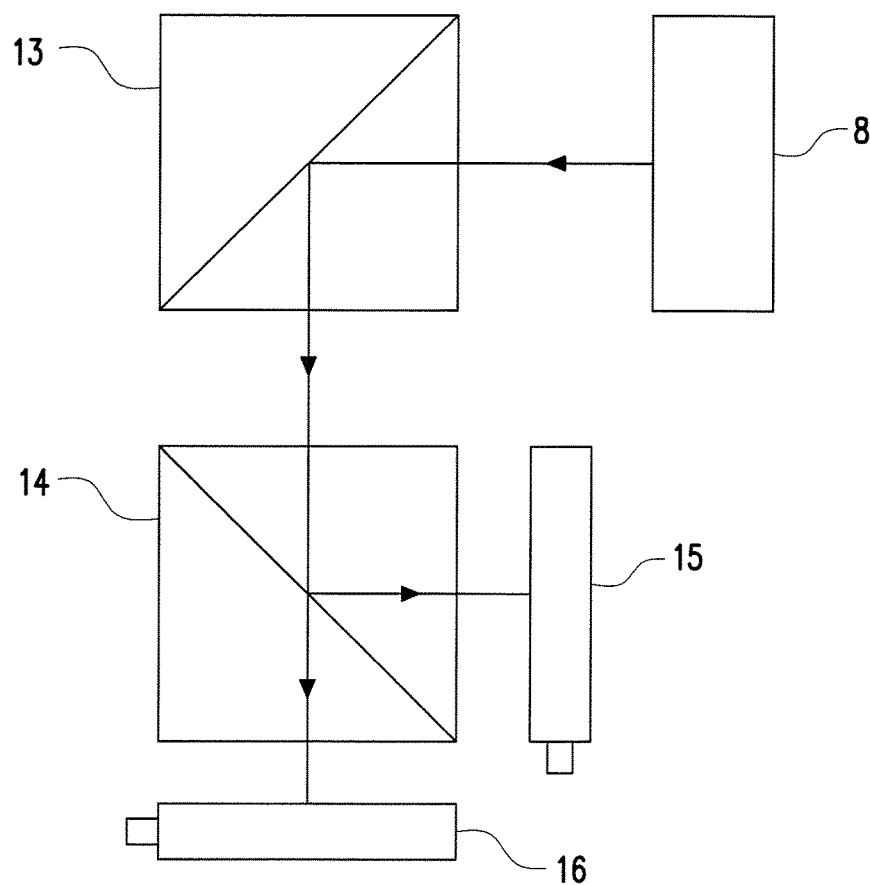
FIG. 4 illustrates the measurement principle of the roll angle and the horizontal straightness.

Similarly, the yaw angle error of the measured object during the motion can be obtained:

Yaw angle error:

$$\alpha = \frac{\Delta x_{PSD}}{2f}$$

where $\Delta x_{PSD}$ is the spot position deviation along the horizontal direction of the position-sensitive detector, $\Delta y_{PSD}$ is the spot position deviation along the vertical direction of the position-sensitive detector, and f is the focal length of the convex lens;

(5) For the determination of the roll angle and the horizontal straightness, as shown in FIG. 4, the beam reflected by the third common beam-splitter 13 is incident on the second polarizing beam-splitter 14 which reflects the beam coming from the upper right-angle prism of the reflecting prism 9 onto the first quadrant detector 15 and transmits the beam coming from the down right-angle prism of the reflecting prism 9 onto the second quadrant detector 16. According to the spot position changes detected by the two quadrant detectors and the mapping relationships of each DOF of the measured object during the motion, the roll angle error and the horizontal straightness error of the measured object during the motion are obtained using laser ray tracing method and optical geometry method:

Roll angle error:

$$\gamma = -\frac{\Delta x_{QD1} + \Delta x_{QD2}}{2(s_0 + s - B)\sin 2\theta}$$

Figure 5:
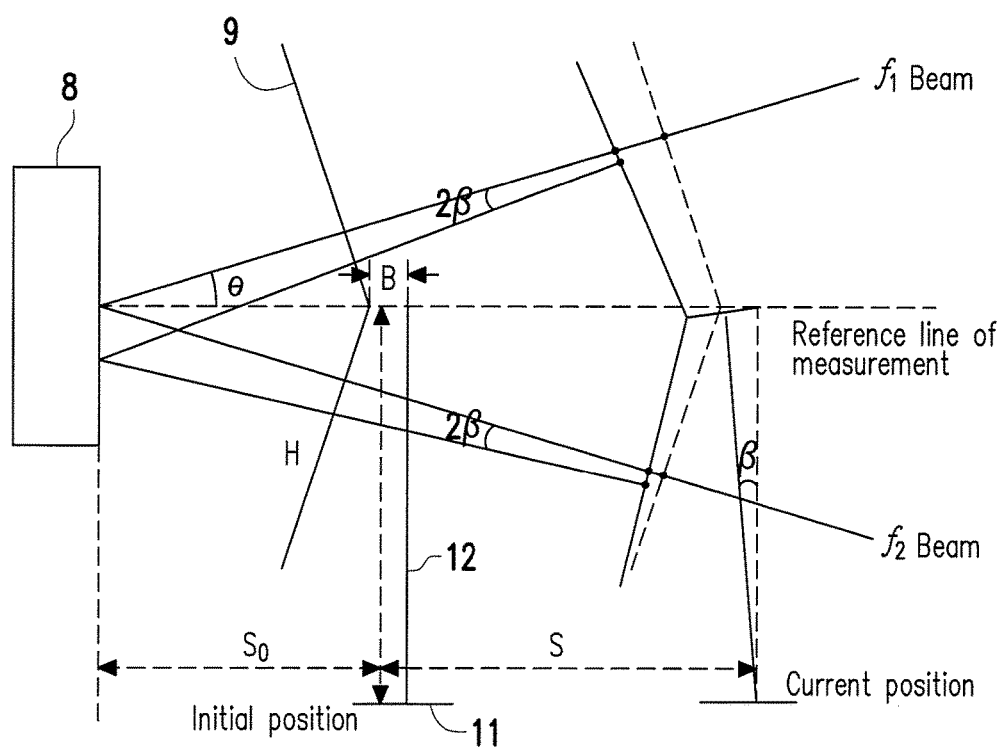
FIG. 5 illustrates the influences of the measured object's rotational errors on the measurement of the vertical straightness error and its position (take the pitch angle as an example).

Horizontal straightness error:

$$w = \frac{\Delta x_{QD2} - \Delta x_{QD1}}{4} - H\gamma - B\alpha - \frac{L}{2}\left(\alpha - \frac{\alpha}{n}\right)$$

where $\Delta x_{QD1}$ is the spot position deviation along the horizontal direction of the first quadrant detector 15, $\Delta x_{QD2}$ is the spot position deviation along the horizontal direction of the second quadrant detector 16, B is the distance between the measuring retroreflector's bracket 12 and the join point of the right-angle sides of the upper and down right-angle prisms, L is the hypotenuse length of the right-angle prism, H is the distance between the join point of the right-angle sides of the upper and down right-angle prisms and the movable platform 11, n is the refractive index of the material of the right-angle prisms, $s_0$ is the distance between the measuring retroreflector's bracket 12 and the Wollaston prism 8 when the movable platform 11 of the measured object is at the initial position before measurement;

In calculation, substitute the relevant constants and the angle measurement values into the equations of the roll angle error and the horizontal straightness error to obtain their measured values;

(6) During measurement, the rotational errors of the measured object will affect the measurement results of the vertical straightness error and its position. As shown in FIG. 5, the explanation is described by taking the pitch angle as an example. When the movable platform 11 moves from the initial position to the current position, the measured object produces a pitch angle error of $\beta$, then using laser ray tracing method and optical geometry method, the expressions for the compensation of the vertical straightness error $\Delta h$ and its position s measured by laser heterodyne interferometry are obtained:

Expression for the compensation of the vertical straightness error: $\Delta h' = \Delta h - (s_0 + s - B)\beta$ Expression for the compensation of the straightness error's position:

$$s' = s + \Delta h\beta - H\beta - \frac{\alpha}{2n}L$$

After the measurement, substitute the relevant constants and the angle measurement values into the equations above to compensate the measured values in Step (3). The accurate values of the vertical straightness error and its position without the influence of the rotational errors of the measured object are obtained after processing by the computer. The measurement accuracies of the embodiment results: the measurement result of the vertical straightness before compensation is 41.85 μm and the measurement result of the vertical straightness after compensation is 9.85 μm, the standard deviation of the measurement result of the straightness error's position before compensation is 3.67 μm and the standard deviation of the measurement result of the straightness error's position after compensation is 0.33 μm.

From the above, these show that the present invention realizes the simultaneous determination of six DOFs error parameters of a measured object, providing great convenience for the performance testing and calibration of precision stages or guide rails. The present invention eliminates the influence of the rotational errors of the measured object on the vertical straightness error and its position, improving the measurement accuracy, featuring a simple optical configuration and easy to use, and having significant technical effects.

The embodiment above is intended to explain the present invention, but not limit the present invention. Any modification and change made to the present invention within the protection scope of the spirit and the Claims of the present invention fall in the protection scope of the present invention.

What is claimed is:

1. A laser heterodyne interferometric straightness measurement apparatus with six degrees of freedom (DOFs) determination, comprising:

a part for determining a straightness and its position based on laser heterodyne interferometry and a part for error determination and compensation, wherein the part for determining the straightness and its position based on laser heterodyne interferometry comprises a dual-frequency laser (1) with beat frequency signal output, a nonpolarizing beam-splitter (6), a Wollaston prism (8), a reflecting prism (9), a first polarizing beam-splitter (7), a first analyzer (17), a second analyzer (19), a first photodetector (18) and a second photodetector (20); and the part for error determination and compensation comprises a first common beam-splitter (2), a second common beam-splitter (5), a planar mirror (10), a convex lens (4), a position-sensitive detector (3), a third common beam-splitter (13), a second polarizing beam-splitter (14), a first quadrant detector (15) and a second quadrant detector (16), wherein a measuring retroreflector made up of the planar mirror (10) and the reflecting prism (9) is mounted on a movable platform (11) of a measured object by means of a measuring retroreflector's bracket (12);

wherein a beat frequency signal output from a beat frequency signal output port of the dual-frequency laser (1) is regarded as a reference signal; a beam emitted from the dual-frequency laser (1) passes through the first common beam-splitter (2) and is incident on the nonpolarizing beam-splitter (6); the nonpolarizing beam-splitter (6) splits the beam into a transmitted beam of the nonpolarizing beam-splitter and a reflected beam of the nonpolarizing beam-splitter; the reflected beam of the nonpolarizing beam-splitter is incident on the first polarizing beam-splitter (7) which splits the reflected beam of the nonpolarizing beam-splitter into a transmitted beam with a frequency of $f_1$ and a reflected beam with a frequency of $f_2$; the transmitted beam of the nonpolarizing beam-splitter (6) is incident on the Wollaston prism (8) which splits the transmitted beam of the nonpolarizing beam-splitter into two beams with the frequencies of $f_1$ and $f_2$, respectively; after reflected by the reflecting prism (9), the two beams split by the Wollaston prism (8) are superimposed with Doppler frequency shifts caused by a motion of the measured object; the frequencies of the two beams split by the Wollaston prism (8) are changed into $f_1 \pm \Delta f_1$ and $f_2 \pm \Delta f_2$; and the two beams reflected by the reflecting prism (9) return to the Wollaston prism (8) and combine into one emergent beam;

wherein a combined emergent beam from the Wollaston prism (8) passes through the third common beam-splitter (13) and is incident on the first polarizing beam-splitter (7), and the first polarizing beam-splitter (7) splits the combined emergent beam into a transmitted beam and a reflected beam, wherein the transmitted beam with the frequency of $f_1 \pm \Delta f_1$ that is output by the combined emergent beam being incident on the first polarizing beam-splitter (7) and the reflected beam with the frequency of $f_2$ that is output by the reflected beam of the nonpolarizing beam-splitter being incident on the first polarizing beam-splitter (7) recombine into one beam which is incident on the first analyzer (17) and received by the first photodetector (18) to generate a first measurement signal; and the reflected beam with the frequency of $f_2 \pm \Delta f_2$ that is output by the combined emergent beam being incident on the first polarizing beam-splitter (7) and the transmitted beam with the frequency of $f_1$ that is output by the reflected beam of the nonpolarizing beam-splitter being incident on the first polarizing beam-splitter (7) recombine into one beam which is incident on the second analyzer (19) and received by the second photodetector (20) to generate a second measurement signal;

wherein besides a beam passing through the first common beam-splitter (2), one beam is reflected when the beam emitted from the dual-frequency laser (1) is incident on the first common beam-splitter (2), this reflected beam is then reflected by the second common beam-splitter (5) onto the planar mirror (10), and the beam reflected by the planar mirror (10) passes through the second common beam-splitter (5), and then is focused by the convex lens (4) to form a spot which is received by the position-sensitive detector (3); and wherein besides a beam passing through the third common beam-splitter (13), one beam is reflected when the combined emergent beam from the Wollaston prism (8) is incident on the third common beam-splitter (13); this reflected beam is incident on the second polarizing beam-splitter (14) which splits the beam into a transmitted beam and a reflected beam; and the transmitted beam is incident on the second quadrant detector (16) and the reflected beam is incident on the first quadrant detector (15).

2. The laser heterodyne interferometric straightness measurement apparatus with six DOFs determination as claimed in claim 1, wherein the reflecting prism (9) comprises an upper right-angle prism and a down right-angle prism; the two beams split by the Wollaston prism (8) are projected to the upper right-angle prism and the down right-angle prism, respectively; and the second polarizing beam-splitter (14) reflects a beam coming from the upper right-angle prism of the reflecting prism (9) onto the first quadrant detector (15) and reflects the beam coming from the down right-angle prism of the reflecting prism (9) onto the second quadrant detector (16).

3. The laser heterodyne interferometric straightness measurement apparatus with six DOFs determination as claimed in claim 1, wherein the measurement apparatus contains a data acquisition module and a computer; the dual-frequency laser (1), the first photodetector (18) and the second photodetector (20) are linked with the computer through the data acquisition module; and two measurement signals output from the first photodetector (18) and the second photodetector (20) and the reference signal from the dual-frequency laser (1) are transmitted to the computer for processing through the data acquisition module.

4. The laser heterodyne interferometric straightness measurement apparatus with six DOFs determination as claimed in claim 1, wherein the planar mirror (10) is mounted on the reflecting prism (9).

5. The laser heterodyne interferometric straightness measurement apparatus with six DOFs determination as claimed in claim 1, wherein the dual-frequency laser (1) emits an orthogonally linearly polarized beam.

6. A laser heterodyne interferometric straightness measurement method with six DOFs determination applied to the apparatus as claimed in claim 1, wherein the method comprises:

1) adopting the apparatus, wherein the measuring retroreflector composed of the planar mirror (10) and the reflecting prism (9) is mounted on the movable platform (11) by means of the measuring retroreflector's bracket (12), a dual-frequency laser (1) which is capable of emitting an orthogonally linearly polarized beam and has a beat frequency signal output port is selected, frequencies of the emitted linearly polarized beam are $f_1$ and $f_2$, respectively, and the linearly polarized beam emitted from the dual-frequency laser (1) goes through an optical path of laser heterodyne interferometry and that of error determination and compensation;

1.1) the optical path of laser heterodyne interferometry: the beat frequency signal output from the beat frequency signal output port of the dual-frequency laser (1) is regarded as the reference signal; the beam emitted from the dual-frequency laser (1) passes through the first common beam-splitter (2) and is incident on the nonpolarizing beam-splitter (6); the nonpolarizing beam-splitter (6) splits the beam into the transmitted beam of the nonpolarizing beam-splitter and the reflected beam of the nonpolarizing beam-splitter; the reflected beam of the nonpolarizing beam-splitter is incident on the first polarizing beam-splitter (7) which splits the reflected beam of the nonpolarizing beam-splitter into the transmitted beam with a frequency of $f_1$ and a reflected beam with a frequency of $f_2$; the transmitted beam of the nonpolarizing beam-splitter (6) is incident on the Wollaston prism (8) which splits the transmitted beam of the nonpolarizing beam-splitter into the two beams with the frequencies of $f_1$ and $f_2$, respectively; after reflected by the reflecting prism (9), the two beams split by the Wollaston prism (8) are superimposed with the Doppler frequency shifts caused by the motion of the measured object; the frequencies of the two beams split by the Wollaston prism (8) are changed into $f_1 \pm \Delta f_1$ and $f_2 \pm \Delta f_2$; and the two beams reflected by the reflecting prism (9) return to the Wollaston prism (8) and combine into one emergent beam; the combined emergent beam from the Wollaston prism (8) passes through the third common beam-splitter (13) and is incident on the first polarizing beam-splitter (7), and the first polarizing beam-splitter (7) splits the combined emergent beam into a transmitted beam and a reflected beam, the transmitted beam with the frequency of $f_1 \pm \Delta f_1$ that is output by the combined emergent beam being incident on the first polarizing beam-splitter (7) and the reflected beam with the frequency of $f_2$ that is output by the reflected beam of the nonpolarizing beam-splitter being incident on the first polarizing beam-splitter (7) recombine into one beam which is incident on the first analyzer (17) and received by the first photodetector (18) to generate the first measurement signal; and the reflected beam with the frequency of $f_2 \pm \Delta f_2$ that is output by the combined emergent beam being incident on the first polarizing beam-splitter (7) and the transmitted beam with the frequency of $f_1$ that is output by the reflected beam of the nonpolarizing beam-splitter being incident on the first polarizing beam-splitter (7) recombine into one beam which is incident on the second analyzer (19) and received by the second photodetector (20) to generate the second measurement signal; and 1.2) optical path of error determination and compensation 1.2.1) besides a beam passing through the first common beam-splitter (2), one beam is reflected when the beam emitted from the dual-frequency laser (1) is incident on the first common beam-splitter (2); this reflected beam is then reflected by the second common beam-splitter (5) onto the planar mirror (10); and the beam reflected again by the planar mirror (10) passes through the second common beam-splitter (5), and then is focused by the convex lens (4) to form a spot which is received by the position-sensitive detector (3); and 1.2.2) besides a beam passing through the third common beam-splitter (13), one beam is reflected when the combined emergent beam from the Wollaston prism (8) is incident on the third common beam-splitter (13); and this reflected beam is incident on the second polarizing beam-splitter (14) which reflects the beam coming from an upper right-angle prism of the reflecting prism (9) onto the first quadrant detector (15) to form a spot and transmits the beam coming from a down right-angle prism of the reflecting prism (9) onto the second quadrant detector (16) to form a spot;

2) moving the movable platform (11) to one end of the measured object which is taken as an initial position of a measurement, and measuring relevant constants, including a distance H between a join point of right-angle sides of the upper and down right-angle prisms of the reflecting prism (9) and the movable platform (11), a distance B between the measuring retroreflector's bracket (12) and the join point of the right-angle sides of the upper and down right-angle prisms of the reflecting prism (9) and a distance $s_0$ between the measuring retroreflector's bracket (12) and the Wollaston prism (8);

prior to the measurement, adjusting the position-sensitive detector (3) and the two quadrant detectors (15) and (16) to bring laser spots to their respective centers; during the measurement, moving the movable platform (11) of the measured object from the initial position to the other end, and processing detection signals from the detectors to obtain DOF parameters of the measured object;

3) in accordance with a geometric relationship in the optical path of laser heterodyne interferometry, obtaining a vertical straightness error and its position of the measured object during motion using the following equations:

vertical straightness error:

$$\Delta h = \frac{L_1 - L_2}{2\sin\theta}; \text{ and}$$

position of straightness error:

$$s = \frac{L_1 + L_2}{2\cos\theta},$$

where $\theta$ is a half of a divergent angle of the Wollaston prism, $L_1$ is a measurement value of a displacement of a first path, and $L_2$ is a measurement value of a displacement of a second path; and 4) in the optical path of error determination and compensation, employing a yaw angle and pitch angle determination method as well as a roll angle and horizontal straightness determination method separately to perform a simultaneous measurement to achieve four DOFs of the yaw angle, the pitch angle, the roll angle and the horizontal straightness of the measured object, employing an error compensation method to compensate the errors of the vertical straightness and its position measured through the optical path of laser heterodyne interferometry; then, completing the six DOFs determination of the measured object, and realizing the heterodyne interferometric straightness measurement.

7. The laser heterodyne interferometric straightness measurement method with six DOFs determination applied to the apparatus as claimed in claim 6, wherein the measurement value of the displacement of the first path $L_1$ and that of the second path $L_2$ are obtained below, respectively:

3.1) according to a reference signal output from the dual-frequency laser (1) and the first measurement signal detected by the first photodetector (18), the measurement value of the displacement of the first path $L_1$ is obtained using the following equation:

$$L_1 = \frac{\lambda_1}{2} \int_0^t \Delta f_1 \, dt,$$

where $\Delta f_1$ is the Doppler frequency shift of the beam with the frequency of $f_1$ caused by the motion of the measured object, $\lambda_1$ is the wavelength of the beam with the frequency of $f_1$, $f_1$ is the frequency of the transmitted beam output from the first polarizing beam-splitter (7) and t is time; and 3.2) according to the reference signal output from the dual-frequency laser (1) and the second measurement signal detected by the second photodetector (20), the measurement value of the displacement of the second path $L_2$ is obtained using the following equation:

$$L_2 = \frac{\lambda_2}{2} \int_0^t \Delta f_2 \, dt,$$

where $\Delta f_2$ is the Doppler frequency shift of the beam with the frequency of $f_2$ caused by the motion of the measured object, $\lambda_2$ is the wavelength of the beam with the frequency of $f_2$, $f_2$ is the frequency of the reflected beam output from the first polarizing beam-splitter (7).

8. The laser heterodyne interferometric straightness measurement method with six DOFs determination applied to the apparatus as claimed in claim 6, wherein the yaw angle and pitch angle determination method in step 4) includes: prior to measurement, adjusting the position of the position-sensitive detector (3) to bring the spot on the position-sensitive detector (3) to the center of the position-sensitive detector (3); and during the measurement, obtaining the yaw angle error and the pitch angle error during the motion of the measured object by using the following equation in accordance with a spot position deviation detected by the position-sensitive detector (3):

yaw angle error:

$$\alpha = \frac{\Delta x_{PSD}}{2f}; \text{ and}$$

pitch angle error:

$$\beta = \frac{\Delta y_{PSD}}{2f},$$

where $\Delta x_{PSD}$ is the spot position deviation along a horizontal direction of the position-sensitive detector, $\Delta y_{PSD}$ is the spot position deviation along a vertical direction of the position-sensitive detector, and f is a focal length of the convex lens.

9. The laser heterodyne interferometric straightness measurement method with six DOFs determination applied to the apparatus as claimed in claim 6, wherein the roll angle and horizontal straightness determination method in step 4) includes: prior to measurement, adjusting the position of the two quadrant detectors (15) and (16) to bring the spots on the two quadrant detectors (15) and (16) to their respective centers; and during the measurement, obtaining the roll angle error and the horizontal straightness error during the motion of the measured object by using the following equations in accordance with a mapping relationship between the spot position deviations detected by the two quadrant detectors and the DOFs of the measured object during motion:

roll angle error:

$$\gamma = -\frac{\Delta x_{QD1} + \Delta x_{QD2}}{2(s_0 + s - B)\sin 2\theta}; \text{ and}$$

horizontal straightness error:

$$w = \frac{\Delta x_{QD2} - \Delta x_{QD1}}{4} - H\gamma - B\alpha - \frac{L}{2}\left(\alpha - \frac{\alpha}{n}\right),$$

where $\Delta x_{QD1}$ is a spot position deviation of the first quadrant detector (15) along the horizontal direction, $\Delta x_{QD2}$ is a spot position deviation of the second quadrant detector (16) along the horizontal direction, B is a distance between the measuring retroreflector's bracket (12) and the join point of the right-angle sides of the upper and down right-angle prisms, L is a hypotenuse length of the right-angle prism, H is a distance between the join point of the right-angle sides of the upper and down right-angle prisms and the movable platform, n is a refractive index of the material of the right-angle prisms, $s_0$ is a distance between the measuring retroreflector's bracket and the Wollaston prism when the movable platform of the measured object is at the initial position before measurement, $\alpha$ is a yaw angle error, $\gamma$ is a roll angle error, s is a position of the straightness error, and $\theta$ is a half of the divergent angle of the Wollaston prism.

10. The laser heterodyne interferometric straightness measurement method with six DOFs determination applied to the apparatus as claimed in claim 6, wherein the error compensation method in step 4) includes: during measurement, a rotation of the measured object affects measurement results of a vertical straightness error and its position, and the vertical straightness error and its position measured through the laser heterodyne interferometry are compensated using the following equations:

vertical straightness error after compensation:
$\Delta h' = \Delta h - (s_0 + s - B)\beta$; and position of the straightness error after compensation:

$$s' = s + \Delta h \beta - H\beta - \frac{\alpha}{2n}L,$$

where B is a distance between the measuring retroreflector's bracket (12) and the join point of the right-angle sides of the upper and down right-angle prisms, L is a hypotenuse length of the right-angle prism, H is a distance between the join point of the right-angle sides of the upper and down right-angle prisms and the movable platform, n is a refractive index of the material of the right-angle prisms, $s_0$ is a distance between the measuring retroreflector's bracket and the Wollaston prism when the movable platform of the measured object is at the initial position before measurement, $\alpha$ is a yaw angle error, $\beta$ is the pitch angle error, $\Delta h$ is a vertical straightness error, and s is a position of the straightness error.

* * * * *